United States Patent
Kristensen et al.

(10) Patent No.: US 10,022,703 B2
(45) Date of Patent: Jul. 17, 2018

(54) METHOD OF PREPARATION OF NANOPARTICULAR METAL OXIDE CATALYSTS

(71) Applicant: Danmarks Tekniske Universitet, Lyngby (DK)

(72) Inventors: Steffen Buus Kristensen, Kgs. Lyngby (DK); Andreas Jonas Kunov-Kruse, Cambridge, MA (US); Anders Riisager, Taastrup (DK); Rasmus Fehrmann, København Ø (DK)

(73) Assignee: DANMARKS TEKNISKE UNIVERSITET, Lyngby (DK)

( * ) Notice: Subject to any disclaimer, the term of this patent is extended or adjusted under 35 U.S.C. 154(b) by 15 days.

(21) Appl. No.: 14/785,279

(22) PCT Filed: Apr. 11, 2014

(86) PCT No.: PCT/EP2014/057376
§ 371 (c)(1),
(2) Date: Oct. 16, 2015

(87) PCT Pub. No.: WO2014/170222
PCT Pub. Date: Oct. 23, 2014

(65) Prior Publication Data
US 2016/0067678 A1 Mar. 10, 2016

(30) Foreign Application Priority Data

Apr. 17, 2013 (EP) ..................................... 13164087

(51) Int. Cl.
*B01J 23/22* (2006.01)
*B01J 37/08* (2006.01)
(Continued)

(52) U.S. Cl.
CPC .......... *B01J 23/22* (2013.01); *B01D 53/8628* (2013.01); *B01J 21/063* (2013.01); *B01J 35/002* (2013.01);
(Continued)

(58) Field of Classification Search
None
See application file for complete search history.

(56) References Cited

U.S. PATENT DOCUMENTS

| 2006/0084569 A1 | 4/2006 | Augustine et al. |
| 2011/0095242 A1 | 4/2011 | Jin et al. |
| 2012/0014854 A1* | 1/2012 | Fehrmann ......... B01D 53/8628 423/239.1 |

FOREIGN PATENT DOCUMENTS

EP 2189217 A1 5/2010

OTHER PUBLICATIONS

Alberici et al., "Photocatalytic destruction of VOCs in the gas-phase using titanium dioxide," *Applied Catalysis B: Environmental*, vol. 14, pp. 55-68 (1997).
(Continued)

*Primary Examiner* — Melvin C. Mayes
*Assistant Examiner* — Michael Forrest
(74) *Attorney, Agent, or Firm* — Knobbe, Martens, Olson & Bear, LLP (57) ABSTRACT

The disclosure concerns an improved method of preparation of nanoparticular vanadium oxide/anatase titania catalysts having a narrow particle size distribution. In particular, the disclosure concerns preparation of nanoparticular vanadium oxide/anatase titania catalyst precursors comprising combustible crystallization seeds upon which the catalyst metal oxide is coprecipitated with the carrier metal oxide, which crystallization seeds are removed by combustion in a final calcining step.

29 Claims, 8 Drawing Sheets

(51) Int. Cl.
  *B01D 53/86* (2006.01)
  *B01J 37/03* (2006.01)
  *B01J 35/10* (2006.01)
  *B01J 21/06* (2006.01)
  *B01J 35/00* (2006.01)
  *B82Y 40/00* (2011.01)

(52) U.S. Cl.
  CPC ........... *B01J 35/004* (2013.01); *B01J 35/006* (2013.01); *B01J 35/0013* (2013.01); *B01J 35/1014* (2013.01); *B01J 35/1019* (2013.01); *B01J 37/035* (2013.01); *B01J 37/08* (2013.01); *B01D 2255/20707* (2013.01); *B01D 2255/20723* (2013.01); *B82Y 40/00* (2013.01)

(56) References Cited

OTHER PUBLICATIONS

Bellifa et al., "Preparation and characterization of 20 wt.% $V_2O_5$-$TiO_2$ catalyst oxidation of cyclohexane," *Applied Catalysis A: General*, vol. 305, pp. 1-6 (2006).

Burns et al., "Effect of Inorganic Ions in Heterogeneous Photocatalysis of TCE," *Journal of Environmental Engineering*, vol. 125(1), pp. 77-85 (1999).

Busca et al., "Chemical and mechanistic aspects of the selective catalytic reduction of $NO_x$ by ammonia over oxide catalysts: A review," *Applied Catalysis B: Environmental*, vol. 18, pp. 1-36 (1998).

Dibble et al., "Fluidized-Bed Photocatalytic Oxidation of Trichloroethylene in Contaminated Airstreams," *Environmental Science & Technology*, vol. 26, pp. 492-495 (1992).

Everaert et al., "Catalytic combustion of volatile organic compounds," *Journal of Hazardous Materials*, vol. B109, pp. 113-139 (2004).

Gao et al., "Molecular engineering of supported vanadium oxide catalysts through support modification," *Topics in Catalysis*, vol. 18(3-4), pp. 243-250 (2002).

Kang et al., "Methyl Orange Removal in a Liquid Photo-System with Nanometer Sized $V/TiO_2$ Particle," *Journal of Industrial and Engineering Chemistry*, vol. 11(2), pp. 240-247 (2005).

Kennedy III et al., "Photothermal Heterogeneous Oxidation of Ethanol over $Pt/TiO_2$," *Journal of Catalysis*, vol. 179, pp. 375-389 (1998).

Kumar et al., "An investigation of the thermal stability and performance of wet-incipient $WO_3/V_2O_5/TiO_2$ catalysts and a comparison with flame aerosol catalysts of similar composition for the gas-phase oxidation of methanol," *Applied Catalysis B: Environmental*, vol. 69, pp. 101-114 (2006).

Parvulescu et al., "Catalytic removal of NO," *Catalysis Today*, vol. 46, pp. 233-316 (1998).

Rass-Hansen et al., "Perspective Bioethanol: fuel or feedstock?," *Journal of Chemical Technology and Biotechnology*, vol. 82, pp. 329-333 (2007).

Serpone et al., "Exploiting the interparticle electron transfer process in the photocatalysed oxidation of phenol, 2-chlorophenol and pentachlorophenol: chemical evidence for electron and hole transfer between coupled semiconductors," *Journal of Photochemistry and Photobiology A: Chemistry*, vol. 85, pp. 247-255 (1995).

Tanizaki et al., "Titanium dioxide ($TiO_2$)-assisted Photocatalytic Degradation of Volatile Organic Compounds at ppb Level," *Journal of Health Science*, vol. 53(5), pp. 514-519 (2007).

Weckhuysen et al., *Spectroscopy of Transition Metal Ions on Surfaces*, Leuven University Press (2000).

Weckhuysen et al., "Chemistry, spectroscopy and the role of supported vanadium oxides in heterogeneous catalysis," *Catalysis Today*, vol. 78, pp. 25-46 (2003).

Zorn et al., "Photocatalytic oxidation of acetone vapor on $TiO_2$/$ZrO_2$ thin films," *Applied Catalysis B: Environmental*, vol. 23, pp. 1-8 (1999).

\* cited by examiner

Fig. 1 – Prior art method

Fig. 4 (amended)

METHOD OF PREPARATION OF NANOPARTICULAR METAL OXIDE CATALYSTS

FIELD OF THE INVENTION

The present invention concerns an improved method of preparation of nanoparticular metal oxide catalysts having a narrow particle size distribution. The catalysts comprise a carrier of a metal oxide and a catalytically active surface and are useful for the selective removal of nitrogen oxides from gases. In particular, the invention concerns the preparation of nanoparticular metal oxide catalyst precursors comprising crystallization seeds upon which the catalyst metal oxide is co-precipitated with the carrier metal oxide. The crystallization seeds are removed by thermal decomposition in a final calcining step.

The present invention also concerns nanoparticular vanadium oxide catalysts with catalyst loadings of up to 20% $V_2O_5$ by weight of the final catalyst.

BACKGROUND OF THE INVENTION

Vanadium oxides on inorganic support materials constitute the most important supported metal oxide catalysts in both heterogeneous and homogeneous industrial applications [Weckhuysen B M, Van Der Voort P, Catana G (eds) (2000) Spectroscopy of transition metal ions on surfaces. Leuven University Press, Leuven]. In these catalysts, the amount of active vanadium species exposed to the reactants varies with the type of support and the loading of vanadium oxide on the carrier [Gao X, Wachs I E (2002) Top Catal 18:243]. Here both the surface area and the oxide type (i.e., textural and surface properties) dictate the maximum amount that can be loaded before surpassing the monolayer coverage leading to crystalline $V_2O_5$ formation [Weckhuysen B M, Keller D E (2003) Catal Today 78:25]. Typical examples of support materials are $SiO_2$, $Al_2O_3$, $ZrO_2$, and $TiO_2$. The preferred choice of support material usually depends on the reactive environment of the catalyst during operation as well as the particular reaction in focus.

In the gas-phase oxidation of aqueous ethanol a $V_2O_5$ catalyst supported on $TiO_2$ and immobilized on clay described in U.S. Pat. No. 5,840,971 was found to provide a very high selectivity of 97% towards acetic acid even at relatively moderate temperatures and pressures (180° C. and 1.7 bar) with the only byproduct being $CO_2$. This was an interesting finding, especially due to the growing interest worldwide in production and utilization of bioethanol. Bioethanol has found main usage as fuel or fuel additive in the transport sector, though at present it is impossible to produce enough bioethanol to replace gasoline. Moreover, it is required that all water, which typically accounts for up to 95 wt %, is removed from crude bioethanol prior to its use in combustion engines to reach satisfying fuel utilization. Initial flash distillation will generally provide a fraction with about 50 wt % water remaining, while further water removal is a very energy demanding and costly process.

Alternatively it has therefore been suggested that ethanol is further converted into higher value-added chemicals via reactions that are not as sensitive to the water content [Rass-Hansen J et al., J. Chem. Technol. Biotechnol. 82 (2007) 329]. In this context an interesting possibility is to oxidize the ethanol whereby commodity acetyl derivatives such as, e.g. acetaldehyde, acetic acid and ethyl acetate can be formed. Of these possibilities only the formation of acetic acid has been demonstrated under commercially interesting conditions, and there is consequently a need for a relatively cheap and robust catalyst that may effect the conversion of aqueous ethanol such as bioethanol from fermentation to other industrially applicable derivatives such as acetaldehyde.

$V_2O_5$ catalysts supported on $TiO_2$ are not only interesting in relation to oxidation processes. It is also well known that $TiO_2$, especially in the anatase form, is an excellent support for vanadium oxides making highly active materials for the selective catalytic reduction (SCR) of nitrogen oxides (i.e. deNOx) by injection of ammonia in power plant flue-gases and other industrial off-gases [Parvulescu VI, Grange P, Delmon B (1998) Catal Today 46:233]. However, the activity of the industrial $VOx/TiO_2$-based SCR catalyst is limited by the surface area of the anatase carrier, since only up to one monolayer of the vanadium oxide species can be accepted corresponding to a vanadia loading of 3-5 wt.%. Increased loading results in decreased deNOx activity and increased ability to oxidize $NH_3$ and possibly also $SO_2$ in the flue gas [Busca G et al. (1998) Appl Catal 18:1].

Kang M et al. in "*Methyl orange removal in a liquid photo-system with nanometer sized V/TiO₂ particle*", Journal of Industrial And Engineering Chemistry, vol. 11, no. 2, pages 240-247 discloses a nanometer-sized $V/TiO_2$ photo-catalyst synthesized by a commercial sol-gel method for the removal of methyl orange. However, the catalyst composition is mixed anatase/rutile which has inferior catalytic properties. Furthermore the BET surface area is low, ≤15 $m^2/g$. The crystal size of the material is large (20-70 nm) and increases with increasing content of vanadium pentoxide. Crystalline vanadium pentoxide is observed in the material of Kang at a concentration of 10% w/w, possibly even at lower concentrations. Kang's material is not obtained using the seed/template technique, and the application in SCR $deNO_x$ reactions is not mentioned, nor is the SCR activity measured.

Bellifa A et al. in "*Preparation And Characterization Of 20 wt. % V₂O₅—TiO₂ Catalyst Oxidation Of Cyclohexane*", Applied Catalysis A: General, Elsevier Science, Amsterdam Vol. 305, No. 1, (2006) p. 1-6 discloses the preparation of a $V_2O_5$—$TiO_2$ catalyst for the oxidation of cyclohexane. The catalyst is prepared by an acid-catalyzed sol-gel process (not using the seed/template technique), and exhibited a high oxidation activity and selectivity for the conversion of cyclohexane into cyclohexanol. The images obtained by TEM (transition electron microscopy) show nanoparticles in the range from around 20-300 nm.

However, just like Kang's catalyst, Bellifa's catalyst composition is mixed anatase/rutile which has inferior catalytic properties and a low BET surface area, 27 $m^2/g$. It further contains large particles with a small fraction of nanocrystals app 5 nm and displays a very broad particle size distribution. Finally, the material of Bellifa et al. is calcined at a relatively low temperature (300° C.) which is expected to lead to structural changes of the catalyst particles caused by sintering when used for deNOx purposes, i.e. typically at 350-400° C. Bellifa's catalyst is therefore not suited for application in SCR $deNO_x$ reactions and the SCR activity is not measured.

Kumar V et al. in "*An investigation of the thermal stability and performance of wet-incipient WO₃/V₂O₅/TiO₂ catalysts and a comparison with flame aerosol catalysts of similar composition for the gas-phase oxidation of methanol*" Applied Catalysis B: Environmental, Elsevier, Vol. 69, No. 1-2, 2006 Pages 101-114, discloses $WO_3/V_2O_5/TiO_2$ catalysts which are prepared by incipient wetness impregnation and flame aerosol method. The catalyst prepared by flame aerosol method exhibits particles sizes between 28-45 nm and showed good catalytic performances in the oxidation of ethanol. However, like Bellifa's catalyst Kumars material displays a rather low BET surface area, 90 m²/g, and consists of crystals having different sizes up to 30 nm which renders the performance unpredictable, and most importantly, the high-surface area anatase particles of Kumar's material is not stabilized, which leads to a drastic decrease (about 70%) of the surface area when the material is impregnated, even at low $V_2O_5$ concentrations. Again no measurements of NOx SCR activity are reported.

A further interesting application of $V_2O_5$ catalysts supported on $TiO_2$ is in the areas of catalytic combustion of volatile organic compounds (VOCs) [Everaert K et al., Journal of Hazardous Materials B109 (2004) 113-139] and especially in the photocatalytic degradation of VOCs [Tanizaki T et al., Journal of Health Science, 53(5) 514-519 (2007)].

In the atmosphere, especially in indoor air, there are many kinds of volatile organic compounds (VOCs) which lead to water and air pollution, and even to indoor air pollution. Though their concentrations are generally at low ppb levels, some of them have a harmful influence on the living environment: for example, the odorous substances which are generated by the biological activity of human beings and other animals; the "sick building" chemicals vaporized from paint, and bonds used as building materials.

A promising approach for remediating VOC is to employ photocatalytic reactors that oxidize these compounds. Semiconducting materials contain electrons that are confined to relatively narrow energy bands. The band of highest energy that contains electrons is the valence band, while the band lying above the valence band, i.e. the conduction band, has very few electrons. The difference in energies between the highest energy of the valence band and the lowest energy of the conduction band is termed the band gap energy.

When a semiconductor absorbs a photon of energy equal to or greater than its band gap, an electron may be promoted from the valence band to the conduction band leaving behind an electron vacancy or "hole" in the valence band. If charge separation is maintained, the electron and the hole may migrate to the catalyst surface where they participate in redox reaction with sorbed species (Burns R. A. et al. (1999) Journal of Environmental Engineering, January, 77-85).

Photocatalytic oxidation of VOCs is a cost-effective technology for removal of VOCs compared with adsorption, biofiltration, or thermal catalysis. The most commonly used catalyst in this application is titanium dioxide (titania) because of its stability under most reaction conditions, and because $TiO_2$ is an inexpensive, non-toxic and biocompatible material. Numerous studies have indicated that illuminating the anatase form of $TiO_2$ with near UV radiation has been successful in eliminating organic compounds such as methanol, acetone, methyl ethyl ketone, isopropanol, chloroform and trichloroethylene (Alberici R. M. et al. (1997) Appl Catal B: Environmental, vol 14, 55-68; Dibble L. A. et al. Environmental Science and Technologies, vol 26, 492-495).

For the possible destruction of VOCs at room temperature, consideration has also been given to the photocatalytic oxidation of gaseous phase organic compounds, using $TiO_2$-based catalysts coupled with other catalytically active materials. For example, has the photocatalytic oxidation of acetone with a pure $TiO_2$ catalyst or a mixed $TiO_2/ZrO_2$ catalyst at 77° C., prepared in thin layer form using a sol-gel method, been described (Zorn M E et al (1999) Appl Catal B: Environmental, vol. 23, p. 1-8). Photocatalysts of $Pt/TiO_2$ types have been used to decompose ethanol at a temperature in the region of 200° C. (Kennedy J C. et al. Journal of Catalysis, vol. 179, p. 375-389 (1998). A mixed photocatalyst of $CdS/TiO_2$ type was tested for the decomposition of phenol, 2-chlorophenol and pentachlorophenol in the liquid phase (Serpone N et al. (1995) Journal of Photochemistry and Photobiology A: Chemistry, vol. 85, p. 247-255).

There is consequently a need for a relatively cheap and robust method of preparation, whereby high loadings of different catalytically active species on metal oxide carriers can be achieved without sacrificing catalytic selectivity.

SUMMARY OF THE INVENTION

It has now surprisingly been found that an improved nano-sized particular (nanoparticular) vanadium oxide/anatase $TiO_2$ catalysts with vanadia loadings up to 20 wt. % of the total catalyst mass having an average particle size down to 6 nm±2 nm with a narrow size distribution, and a relatively high-surface area (up to app. 250 m²/g) can be synthesized by a seed-assisted, sol-gel, co-precipitation procedure involving concomitant hydrolysis of titanium(IV) and vanadium(V) alkoxides in the presence of ammonium salt seed crystals, followed by a standard calcination procedure which decompose the ammonium salt template and convert the amorphous titania carrier into crystalline anatase. The small particle size of the anatase support (due to the corresponding high surface area) allowed high loading of at least up to 15 wt % vanadia without exceeding monolayer coverage of $V_2O_5$ in contrast to typical industrial catalysts which only can accommodate 3-5 wt %.

Disclosed herein is therefore an improved method of preparation of nano-sized particular (nanoparticular) vanadium oxide/anatase titania catalysts, the nanoparticular vanadium oxide/anatase titania catalysts comprising an anatase titania carrier and a catalytically active vanadium oxide component, the method comprising the following steps:

a) providing a solution of an ammonia salt in a first solvent;

b) providing a solution of one or more hydrolysable titania precursors and one or more hydrolysable vanadium precursors in a second solvent;

c) combining the solutions of step a) and b) under acidic, aqueous conditions using hydrochloric acid, sulphuric acid or nitric acid, thereby hydrolyzing the one or more hydrolysable titania precursors and the one or more hydrolysable vanadium precursors;

d) aging the reaction mixture of step c) thereby allowing the hydrolytic processes to proceed substantially to completion, thereby providing nanoparticular titania catalyst precursors comprising crystallization seeds upon which the vanadium oxide is co-precipitated with the titania carrier material;

e) removing solvents and volatile reaction components by either
  i) drying at atmospheric pressure and elevated temperatures between 50° C. and 120° C. for between 50 hours and 200 hours, or
  ii) spray drying at elevated temperatures between 50° C. and 120° C., and f) calcining the nanoparticular titania catalysts precursor at temperature above 380° C.

Also disclosed herein is a nanoparticular metal oxide catalysts obtainable by a process as described in the second aspect of the present invention.

Further disclosed herein is also a nano-sized particular (nanoparticular) vanadium oxide/anatase titania catalysts with a monolayer vanadium oxide ($V_2O_5$) loading with a catalyst metal oxide content of up to 25 wt % $V_2O_5$ of the total nanoparticular vanadium oxide/anatase titania catalysts mass, wherein the nanoparticular vanadium oxide/anatase titania catalysts has an average $V_2O_5$ particle size between 4-16 nm and an active surface area/BET surface area between 60-300 $m^2/g$.

An aspect of the invention relates to the use of a nanoparticular metal oxide catalyst of the invention as selective catalytic reduction (SCR) $deNO_x$ catalysts for environmental processes involving elimination of nitrogen oxides from e.g. power plant flue gases or other off-gases containing nitrogen oxides ($NO_x$ such as NO, $NO_2$) by use of a reductant (alkanes, alkenes, alcohols, ammonia or ammonia derivatives such as e.g. urea) which over the catalyst is selectively oxidized by $NO_x$.

Another aspect of the invention relates to the use of a nanoparticular metal oxide catalyst of the invention as oxidation catalysts for the preparation of carboxylic acids, aldehydes or ketones, and mixtures thereof, from neat alcohol or aqueous alcohol solutions in continuous, gas-phase flow reaction mode by employing dioxygen or air as the oxidizing agent.

Another aspect of the invention relates to the use of a nanoparticular metal oxide catalyst of the invention as catalysts for photocatalytic degradation of volatile organic compounds (VOC's) such as, but not limited to, phenol, toluene, xylenes, n-hexane, formaldehyde, methanol, ethanol, isopropanol, acetone, methyl ethyl ketone, chloroform, trichloroethylene and mixtures thereof.

Another aspect of the invention relates to a process for removing nitrogen oxides in the presence of ammonia or urea as reductant from flue gases or other industrial off-gases, which process comprises using a catalyst of the invention at ambient pressure and at temperatures of 100° C. to 500° C. with a stoichiometric or excess amount of the reductant.

Another aspect of the invention relates to a process for the manufacture of $C_1$-$C_6$ carboxylic acids, aldehydes or ketones or mixtures thereof from 1 to 75 wt % aqueous alcohol solutions which process comprises using a catalyst of the invention at pressures from 1 to 20 bars and at temperatures of 100 to 250° C. with an amount of oxidizing agent corresponding to an $O_2$/alcohol molar ratio of between 0.5 to 10.

DETAILED DESCRIPTION OF THE INVENTION

Figure 1:
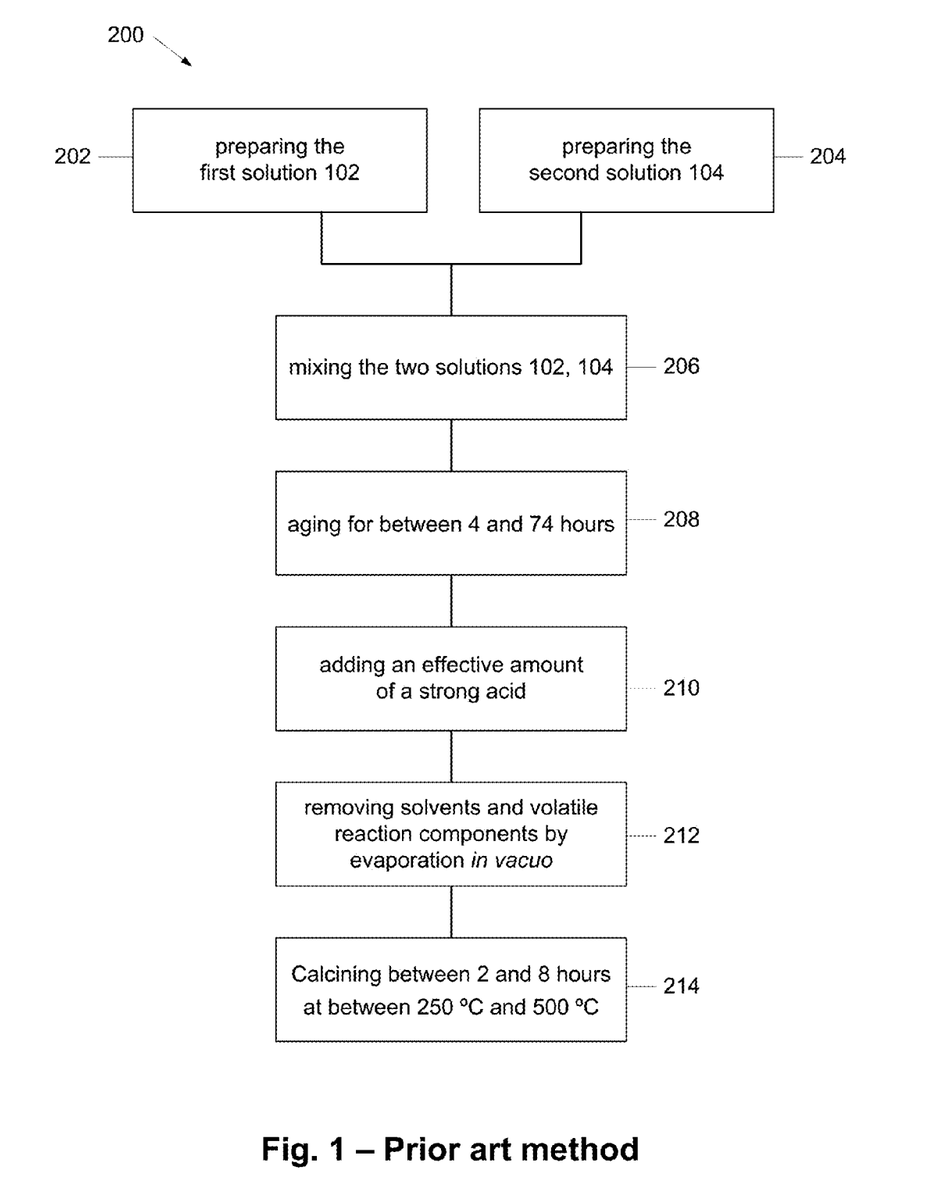
FIG. 1 is a flow diagram illustrating the prior art method 200 of preparation of nanoparticular metal oxide catalysts described in WO2010055169.

FIG. 1 is a flow diagram illustrating the prior art method 200 of preparation of nanoparticular metal oxide catalysts described in WO2010055169, where the nanoparticular metal oxide catalysts comprise a carrier metal oxide and a catalytically active component.

The preparation method comprises the steps of providing two solutions 102, 104, where the first solution 102—prepared in a first step 202—is a solution of a crystallization seed precursor in a first solvent and the second solution 104—prepared in a second step 204—is a solution of one or more hydrolysable carrier metal oxide precursors and one or more hydrolysable catalyst precursors in a second solvent In the subsequent step 206, the first solution 102 and the second solution 104 are combined under acidic, aqueous conditions, whereby the metal oxide and the catalyst precursors are hydrolyzed forming a sol-gel reaction mixture 106. The acidic, aqueous conditions are obtained by use of acetic acid In the following step 208, the sol-gel reaction mixture 106 is aged, normally allowing the aging to proceed for between 4 and 72 hours, thereby allowing the hydrolytic processes to proceed substantially to completion. This provides nanoparticular metal oxide catalyst precursors 108 comprising crystallization seeds upon which the catalyst metal oxide is co-precipitated with the carrier metal oxide.

The precursors 108 are finished to provide nanoparticular metal oxide catalysts 110 by the step 210 of adding an effective amount of a strong sulfated acid, thereby creating a sulfated gel 110, which is aged for an hour at room temperature, and in the subsequent step 212 removing solvents and volatile reaction components from the sulfated gel 110 by evaporation in vacuo thereby creating a dry gel 112, followed by the last step 214 of calcining the dry nanoparticular metal oxide catalyst precursors gel 112 for between 2 and 8 hours at between 250° C. and 500° C. thereby obtaining the finished nanoparticular metal oxide catalysts 114 product.

The sulfated strong acid in WO2010055169 is selected from sulphuric acid, methanesulphonic acid or trifluoromethanesulphonic acid. Alternatively, hydrochloric acid, nitric acid is also suggested. A significant amount of the acetic acid will coordinate strongly to the metal centers on the surface of the formed metal oxide particles as acetate ions. The acetate ions on the surface have shown very difficult to remove from the surface in the absence of the strong acid, even after 100 hours of vacuum treatment at 50° C. (This has been confirmed by IR measurements ($CH_3$ rocking 1030 $cm^{-1}$). The addition of a strong acid will transform the coordinated acetate ions to free acetic acid which is easier to evaporate.

The strong acid further catalyzes the formation of esters which are easily removed from the system just by evaporation at reduced pressures. If not removed from the gel, the acetic acid will damage the catalyst during calcination and a significant drop in catalytic activity is observed. For the application of the invention as SCR deNOx catalysts, sulfuric acid is particularly well-suited as the chosen strong acid due to the promoting effect of sulfate ions which are bound to the nanoparticles after the addition of sulfuric acid. Sulfates are widely known to increase the surface acidity of metal oxides, which is wanted for this type of catalysts. Furthermore, the sulfate stabilizes the metal oxide nanoparticles and thereby increases the surface area significant.

WO2010055169 further reports that for the unsulfated catalyst, the specific acidity was, as expected, very similar to the commercial reference catalyst, although the strength of the acidic sites in the commercial catalyst seemed to be slightly weaker. The total amount of acidic sites in all the nanoparticle catalysts was higher due to the higher surface areas. By sulfation of the carrier, a significant increase in the amount of acidic sites of varying strength was observed corresponding to a total acidity up to three times that of the unsulfated samples.

Figure 2:
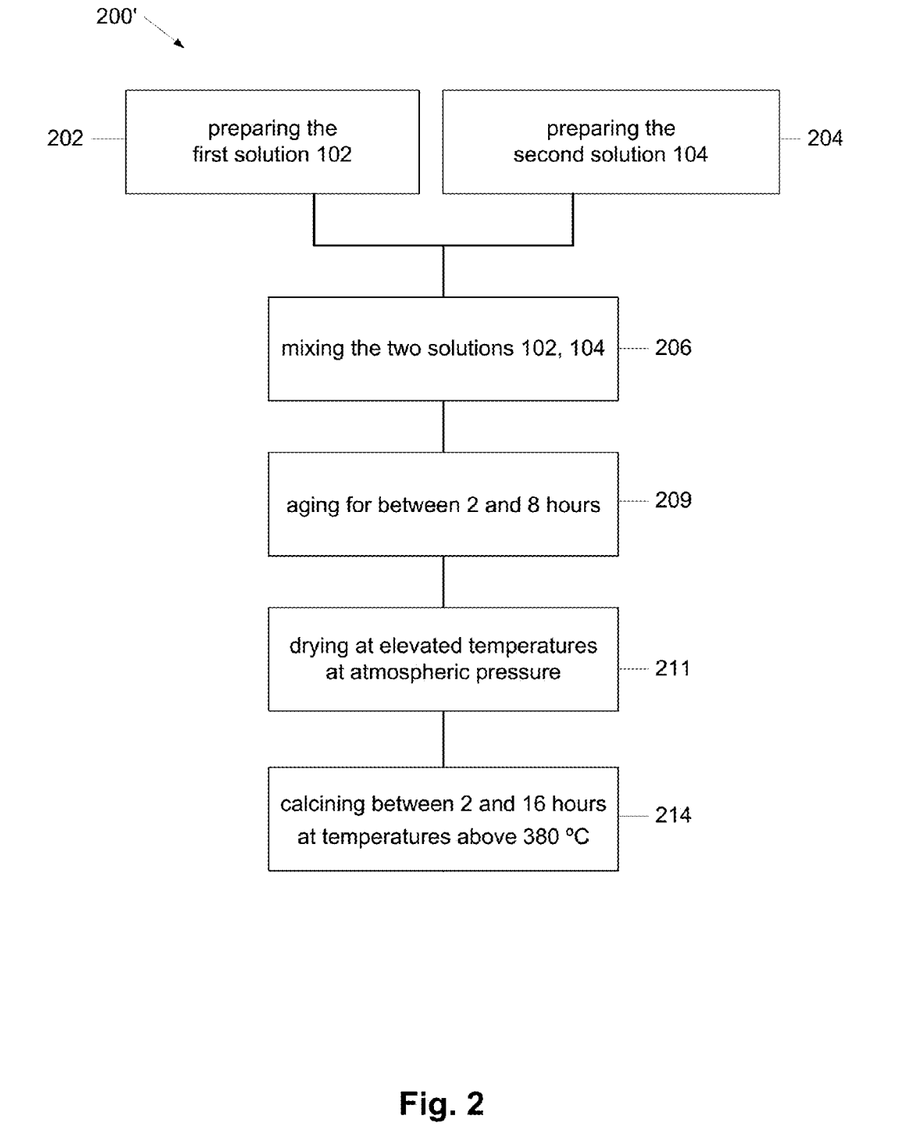
FIG. 2 is a flow diagram illustration the necessary steps in the improved preparation of nanoparticular metal oxide catalysts according to the invention.

FIG. 2 is a flow diagram illustrating the improved method 200' of preparation of nanoparticular metal oxide catalysts comprising a carrier metal oxide and a catalytically active component.

The improved preparation method 200' comprises the steps 202, 204 of providing two solutions 102, 104 in a similar manner as in the prior art method.

The first solution 102 is normally a solution of an ammonia salt crystallization seed precursor in a first solvent, where the first solvent preferably comprises water, The ammonium salt crystallization seed precursor can normally be expressed as:

wherein each R group is individually selected from hydrogen, $C_1$-$C_{12}$ alkyl and phenyl-$C_1$-$C_6$ alkyl including alcohol-, ether-, ester-, amine-, amide-, cyano-, and halogen-functionalized alkyl chains, such that all four R groups are identical or three R groups are identical or two R groups are identical or all four R groups are different; and wherein $X^-$ is a negatively charged ion such as a $C_1$-$C_4$ carboxylate, such as acetate or propanoate, a halide such as chloride or bromide or an oxyanion, such as carbonate, hydrogen carbonate, carbamate, sulfamate, nitrate or sulfate.

In an embodiment of the invention, the ammonium salt is a salt selected from ammonium chloride, ammonium bromide, ammonium nitrate, ammonium carbonate, ammonium hydrogen sulphate, ammonium hydrogen carbonate eller ammonium carbamate or ammonium sulfate. Normally, ammonium chloride will be the preferred choice.

In the improved method, the second solution 104 is normally a solution of one or more hydrolysable titania precursors and one or more hydrolysable vanadium catalyst precursors in a second solvent. The second solvent may be selected from polar, water miscible solvents such as $C_1$-$C_4$ alcohols; cyclic ethers such as tetrahydrofuran and 1,4-dioxane; dialkylketones such as acetone, methylethylketone and methylisobutylketone; alkylnitriles such as acetonitrile and propionitrile; nitromethane, and mixtures thereof, optionally comprising water. Preferably the second solvent is selected from the group of $C_1$-$C_4$ alcohols, tetrahydrofuran, and mixtures thereof, optionally comprising water.

The one or more hydrolysable, titania precursors may further comprises a metal selected from zirconium, cerium, tungsten, silicon and aluminum, or mixtures thereof.

The catalytically active vanadium oxide component further comprises is an oxide of a metal selected from iron, copper, platinum, palladium, chromium, manganese or molybdenum, or mixtures thereof.

In an embodiment of the invention, the one or more hydrolysable titania precursors is anatase titanium dioxide ($TiO_2$) and the one or more hydrolysable vanadium catalyst precursors is $V_2O_5$. The $V_2O_5$ content in the nanoparticular vanadium oxide/anatase titania catalysts can be up to 20 wt %.

In the subsequent step 206 in FIG. 2, the first solution 102 and the second solution 104 are combined under acidic, aqueous conditions, whereby the metal oxide and the catalyst precursors are hydrolyzed forming a sol-gel reaction mixture 106'. The acidic, aqueous conditions are created using hydrochloric acid, sulphuric acid or nitric acid instead of acetic acid in the prior art method.

In the following step 209, the sol-gel reaction mixture 106' is aged thereby allowing the hydrolytic processes to proceed substantially to completion. This provides nanoparticular titania catalyst precursors 108' comprising crystallization seeds upon which the vanadium oxide is co-precipitated with the titania carrier material. Normally, the aging in step 209 proceeds for between 30 minutes and 8 hours, between 2 and 8 hours, between 3 and 6 hours, between 3 and 5 hours, or for 4 hours.

In the improved method, the prior art method step 210 of adding an effective amount of a strong sulfated acid and aging the solution for an hour at room temperature is normally omitted, as it is not necessary to use this step when acetic acid has not been added in the second production step 206.

The step may however be included as it can improve the catalyst in some respects depending on which purpose the catalyst is indented to be used for. If the step is included it may be so by adding an effective amount of a strong acid, such as 0.05-1 mole protons per mole metal oxide, preferably 0.2-0.5 mole protons per mole metal oxide, wherein the strong acid is selected from hydrochloric acid, nitric acid, sulphuric acid, methanesulphonic acid or trifluoromethanesulphonic acid.

Instead of removing solvents and volatile reaction components by evaporation in vacuo as used in the prior art method, the nanoparticular metal oxide catalyst precursors 108' are dried at atmospheric pressure and elevated temperatures for between 50 hours and 200 hours in the following step 211.

Preferably, the elevated temperature used in step 211 is between 70° C. and 95° C. or between 80° C. and 90° C. or at 85° C.

The drying time normally proceeds for more than 100 hours, i.e. for between 100 hours and 200 hours, or for between 60 hours and 200 hours, or between 60 hours and 150 hours, or between 72 hours and 100 hours, or between 80 hours and 90 hours.

As an alternative to drying at atmospheric pressure and elevated temperatures in step 211, spray drying can be used. In this scenario, the temperature is normally between 50° C. and 120° C., between 60° C. and 90° C. or between 70° C. and 80° C. or between 50° C. and 80° C. When using spray drying, the drying time compared to the conventional drying, is significantly reduced.

Finally, in the last step 214 the dry nanoparticular titanic catalyst precursors gel 112' is calcinated normally for between 2 and 8 hours at temperatures above 380° C. The temperatures may alternatively be between 380° C.-500° C., between 380° C.-420° C., between 395° C.-410° C., or at 400° C. Also, the calcining time may alternatively be between 2 and 10 hours, or between 2 and 8 hours, or between 3 and 7 hours, or between 4 and 5 hours.

In WO2010055169, the second solvent was preferably an ethanol solution containing acetic acid (HOAc). However, in the reported improved method of preparation of nanoparticular metal oxide catalysts disclosed herein, HOAc was substituted with nitric acid ($HNO_3$), hydrochloric acid (HCl) or sulfuric acid ($H_2SO_4$) as indicated in step 204 in FIG. 2.

Effect of Choice of Acid in Step 206

Figure 3:
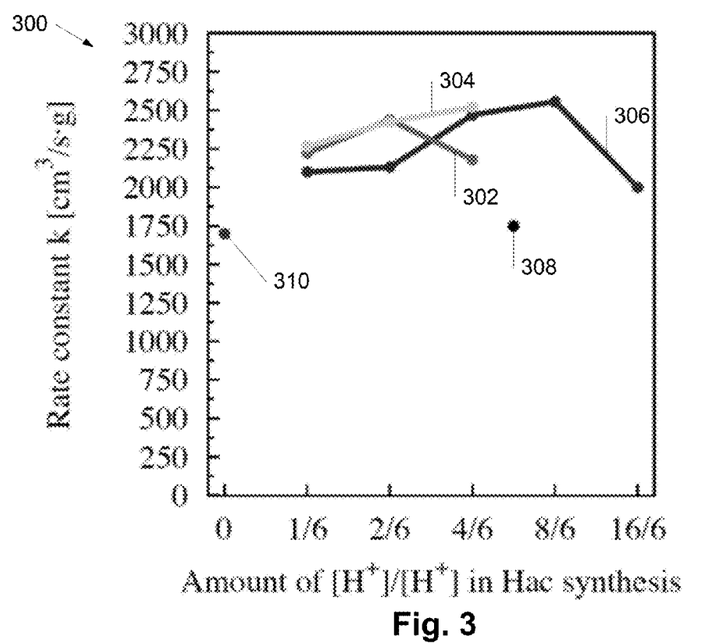
FIG. 3 shows the activity of the catalyst depending on the amount and type of acid added in step 206.

FIG. 3 shows the activity measurements 300 of the nanoparticular metal oxide catalysts prepare by using a solution of ethanol with different acids in step 206 with the rate constant (reflecting the activity) plotted as a function of the acid concentrations. The acid concentrations are expressed as $H^+$ availability compared to HOAc (the three strong acids is assumed fully dissociated). Thus, catalysts synthesised with 1 HOAc and 1 $HNO_3$ in the sol-gel have the same amount of $H^+$, but is added in a 46:1 molar ratio due to the weak nature of HOAc. Using $H_2SO_4$, the molar ratio was reduced to 1:69 at the optimum. Line 302 show the results using $H_2SO_4$ in step 206 in FIG. 2, line 304 shown the results using HCl in step 206 in FIG. 2, and line 306 shown the results using $HNO_3$ in step 206 in FIG. 2. The dots 308 and 310 show the results using HOAc and no acid, respectively, in step 206 in FIG. 2. In all of the measurements, no further sulphation is used corresponding to no use of step 210 as shown in FIG. 1.

From FIG. 3 it is clear that the amount and type of acid has a huge impact on the activity. If no acid is added, a catalyst with low activity is obtained whereas with just small amounts of strong acid added, the activity is increased with up to 47%.

From FIG. 3, it can be concluded that the optimum ratio of 2/6, 4/6 and 8/6 should be chosen for $H_2SO_4$ (see line 302), HCl (see line 304), and $HNO_3$ (see line 306), respectively. It is further seen in the figure, that the catalysts synthesised with HOAc (see line 308) has a surprising poor performance compared with the catalyst synthesised with $H_2SO_4$, HCl and/or $HNO_3$. The low performance of HOAc is partly due to the change in drying process from vacuum drying to using drying at atmospheric pressure.

The BET (Brunauer-Emmett-Teller) surface area 400 as a function of amount of acid added is shown in FIG. 4 again with acid concentrations are expressed as $H^+$ availability compared to HOAc. Line 402 show the results using $H_2SO_4$ in step 206 in FIG. 2, line 404 shown the results using HCl in step 206 in FIG. 2, and line 406 shown the results using $HNO_3$ in step 206 in FIG. 2. The dots 408 and 410 show the results using HOAc and no acid, respectively, in step 206 in FIG. 2.

Figure 4:
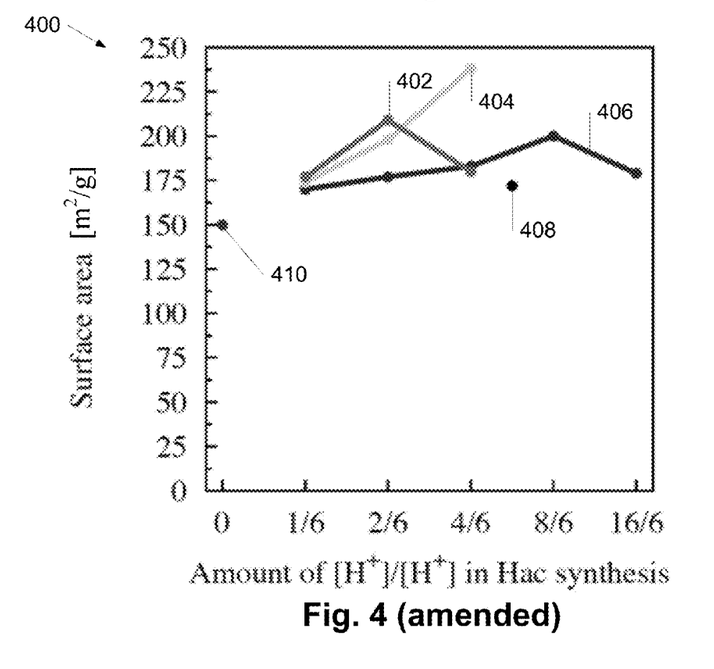
FIG. 4 shows the surface area of the catalyst depending on the amount and type of acid added in step 206.

From FIG. 4 it can be seen that the BET surface area show approximately the same trend as the activity seen in FIG. 3. This indicates that an increase of acid concentration reduces the gelation time forming smaller crystallites, but also exhibits a negative effect when the acid is in great excess.

From FIGS. 3 and 4 it can thus be concluded that varying the type of acid (HOAc, $HNO_3$, $H_2SO_4$ or HCl) and/or the concentration of the acid seems to have the same influence of the surface area and the rate constant in regards to whether it increases or decreases.

Effect of the Choice of the Solvent in Step 204

Figure 5:
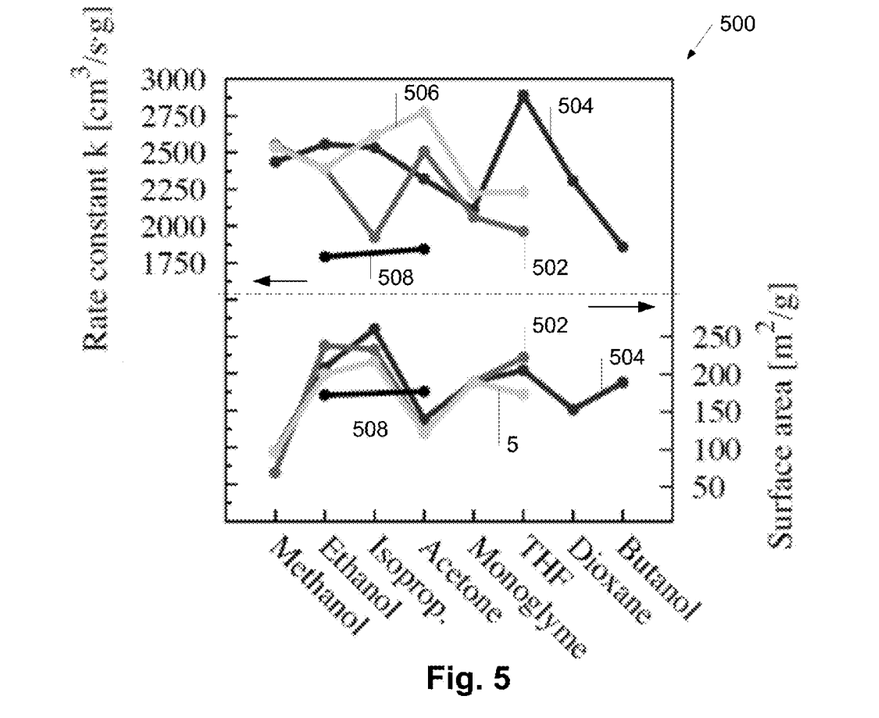
FIG. 5 shows the influence of solvent in step 204 on the activity and the surface area of the catalyst.

In FIG. 5 several different measurements of the rate constant (top part) and the surface area (bottom part) of catalysts synthesised with 8 different solvents in step 204 are shown. The four acids: $H_2SO_4$ (see line 502), HCl (see line 504), $HNO_3$ (see line 506), and HOAc (see line 508) are used in combination with the different solvents. Acid content was chosen on the basis of earlier described acid optimisations of a catalyst synthesised with ethanol (see FIGS. 3 and 4). The amount of solvent was held constant at a metal precursor to molar solvent ratio ($n(Ti_{precourser}+V_{precourser})$:n(solvent)) of 1:30.

In the figure it is seen that the catalysts synthesised with HOAc (see line 508) has a surprising poor performance compared with the catalyst synthesised with $H_2SO_4$, HCl and/or $HNO_3$. Only two catalysts were synthesised with HOAc due to poor results, which can be explained by the ability of the acetate ion to stick to the surface of the catalyst. This results in a catalyst with acetate on the active centres after the drying step. In the calcination step 214, acetate will then be oxidised resulting in reduced and carbon covered active centres. This can be observed by a change in catalyst colour from orange to brown and most importantly as a low activity.

From the surface area measurement as a function of solvent shown in FIG. 5 the bottom part, it is clear that the solvent has a large impact on surface area and that the choice of acid between $H_2SO_4$, HCl or $HNO_3$ is less important in this regard. The choice of acid has an effect of the activity when comparing the results using $H_2SO_4$, HCl or $HNO_3$ instead of HOAc, but the choice between $H_2SO_4$, HCl or $HNO_3$ has a little influence of the surface area.

From FIG. 5 upon comparing the top and the bottom part, it is further clear that the size of the surface area does not exhibit a trend, which follows that of the rate constant upon varying the solvent. I.e, the low surface area obtained when using methanol instead of e.g. ethanol as solvent still gives almost the same rate constant.

Figure 6A:
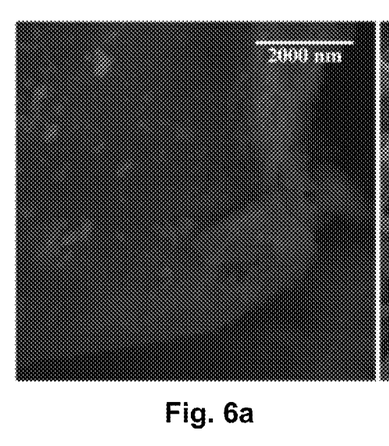
FIGS. 6a-d show SEM and TEM images of two different catalyst.
Figure 6B:
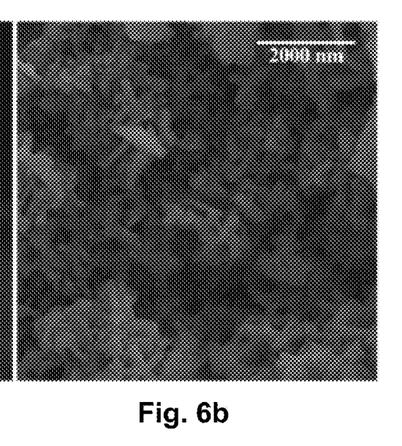
Figure 6C:
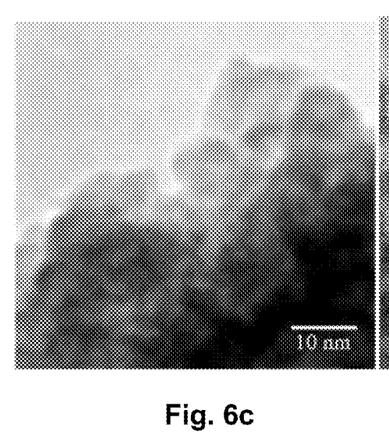
Figure 6D:
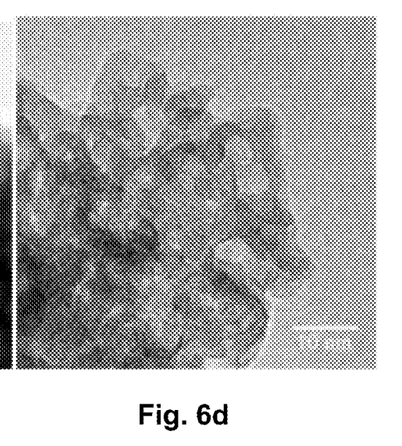

FIGS. 6a/c and 6b/d show the SEM/TEM images of the catalysts synthesised with methanol and $H_2SO_4$ (SEM image shown in FIG. 6a and TEM image shown in FIG. 6c) and the catalyst synthesised with tetrahydrofuran (THF) and $HNO_3$ (SEM image shown in FIG. 6b and TEM image shown in FIG. 6d). The two types of catalysts were chosen since they differ in both activity level and surface area.

From the SEM images (FIGS. 6a and 6b), it is obvious that the methanol sample is much more agglomerated than the THF sample. The TEM images (FIGS. 6c and 6d) of the same catalysts on the other hand show that the crystallite size is approximately the same. This means that the agglomeration is on a macroscopic scale.

Samples synthesised with methanol shows a very low surface area (see FIG. 5 bottom part) but surprisingly still shows an activity, which is very high (FIG. 5 top part). This suggests that there are two types of sites; site A and site B, and that the site distribution between these two types varies depending (primarily) on the choice of solvent and also to a minor extend on the choice of acid.

Figure 7:
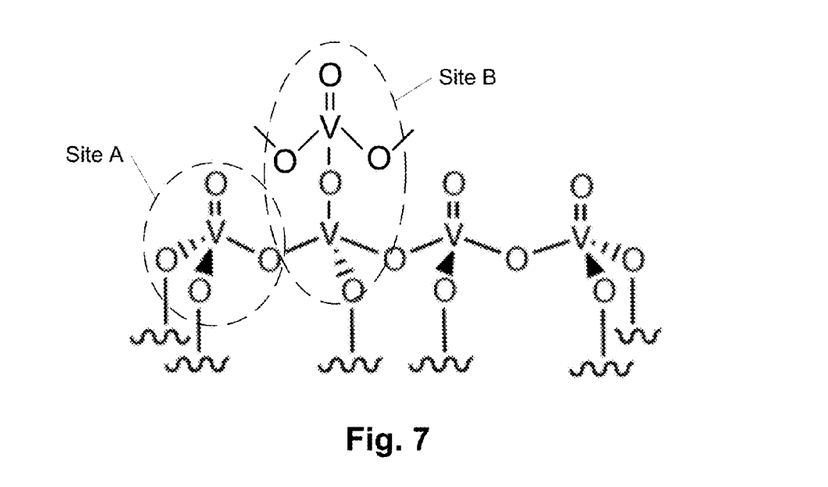
FIG. 7 shows the different sites of the catalyst.

The site A is believed to be a monomeric site whereas the B site is believed to be a site with polymeric overlayer species as illustrated in FIG. 7, respectively. This is also supported by the Raman spectra shown in FIGS. 11a-c displaying peaks from two different species.

The two-site hypothesis explains the behaviour of the methanol-synthesised catalysts having high activity relative to the small surface area when comparing with other catalyst having a larger surface area. This observation points towards to an increase of the polymeric B-sites in the methanol-synthesised catalyst compared to the ethanol catalyst. This is further supported by the Raman spectra in FIGS. 11a-c.

It can thus be concluded that the solvent has an unexpected influence on both the surface area of the support and the type of active sites. This fits with earlier studies indicating that vanadium and titanium alkoxides easily can substitute and/or coordinate with solvents.

One could also argue that an explanation for the variation of activity could be due to formation of large clusters of $V_2O_5$. However, since the SEM measurements (see FIGS. 6a and 6b) show an even distribution of vanadium throughout the sample, this cannot be the case—only small clusters are not visible with the resolution of SEM.

Effect of Substrate Choice in Step 202

Figure 8:
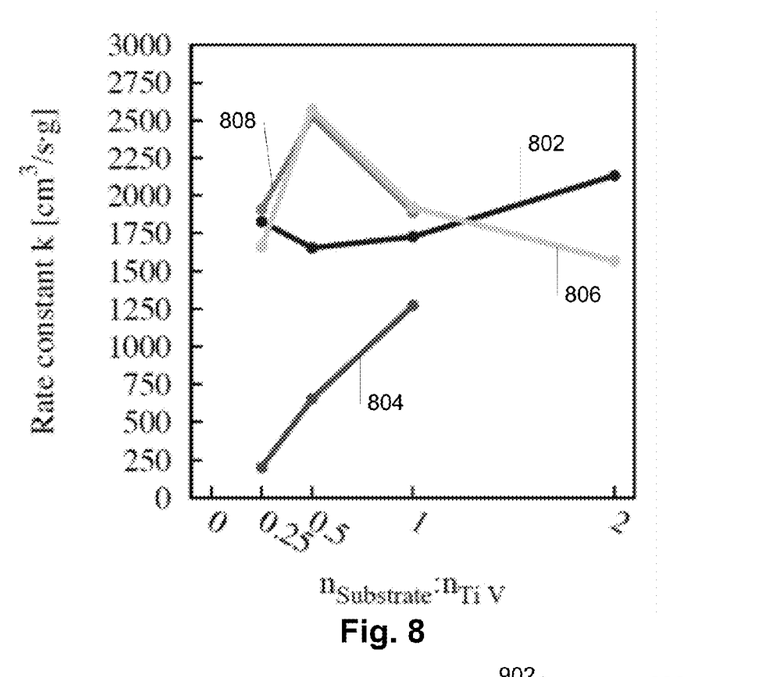
FIG. 8 shows the influence of the seed used in step 202 of the activity of the catalyst.

The use of a different substrate results in different structure-directing substrates, which again yields different crystal sizes and thereby different activities. In FIG. 8, different catalysts synthesised with the four seeds: $NH_4NO_3$ (line 802), $(NH_4)_2CO_3$ (line 804), $NH_4Cl$ (line 806), and $(NH_4)_2SO_4$ (line 808), have been tested for activity. All catalysts have been calcined at 380° C. and the syntheses have been performed using HOAc and EtOH.

From the change of crystallite size it is apparent that $NH_4Cl$ yields bigger crystals than $NH_4NO_3$. Comparing the activity of $NH_4NO_3$ (line 802) and $NH_4Cl$ (line 806) catalysts with crystallite size show that the lower the crystal size the lower activity. This is very surprising, because normally smaller crystals produce higher activities, due to higher surface area. The observations reported here can be explained by either, the lack of catalyst crystallinity throughout the sample and that the amorphous part changes particle size, or that the zeta potential is lowered due to the change in substrate concentration, making agglomeration more pronounced, lowering the surface area.

From the change in crystallite size (not shown here), it can be concluded that $NH_4NO_3$ is stabilising the particles and decreasing crystal growth and that $NH_4Cl$ is doing the opposite, but there is no apparent explanation for this behaviour. $NH_4Cl$ (line 806) and $(NH_4)_2SO_4$ (line 808) are showing the same activity trends and have the highest activity maxima. Thus, either of the two substrates are preferred.

TGA measurements of the pure substrates and catalysts synthesised with different substrates show that the substrates tend to decompose at higher temperatures when added to the catalyst mixture. This makes the calcination more difficult for catalysts containing $(NH_4)_2SO_4$, because the high required calcination temperature (above 450° C.). At these temperatures the catalyst tends to agglomerate, loose the surface $SO_4^{2-}$ sites and form crystalline $V_2O_5$ due to lowered surface area. This results in a less selective and less potassium resistive catalyst.

In order to make the $(NH_4)_2SO_4$ catalysts work, a careful activation at 440° C. in SCR gas is need prior to the activity measurements. As this step should be avoided, due to the cumbersome process, only $NH_4NO_3$ and $NH_4Cl$ can be used as substrates. Measurements further shows that the optimum for both catalysts is at 20 wt % $V_2O_5$. When choosing one substrate over another the potassium resistance has to be considered. The fresh $NH_4Cl$ catalyst is a little better overall, however looking at the potassium resistance there is a bigger difference between the two. The $NH_4Cl$ catalyst is approximately 1.5 times as good as the $NH_4NO_3$ counterpart. From this it is clear that the best substrate is $NH_4Cl$ at a $n_{Substrate}$:$n_{Ti,V}$ ratio of 1:4, yielding the most active catalyst. This is not the catalyst with highest surface area or lowest crystal size, which is surprising.

The thermal stability of $NH_4Cl$ is much more stable at high temperatures, and using $NH_4Cl$ as substrate therefore yields a more active catalyst and a catalyst with higher potassium and thermal resistance.

Measurements further showed that the optimum temperature used in the mixing step 206 is around 0° C. yielding the highest activity.

Figure 9:
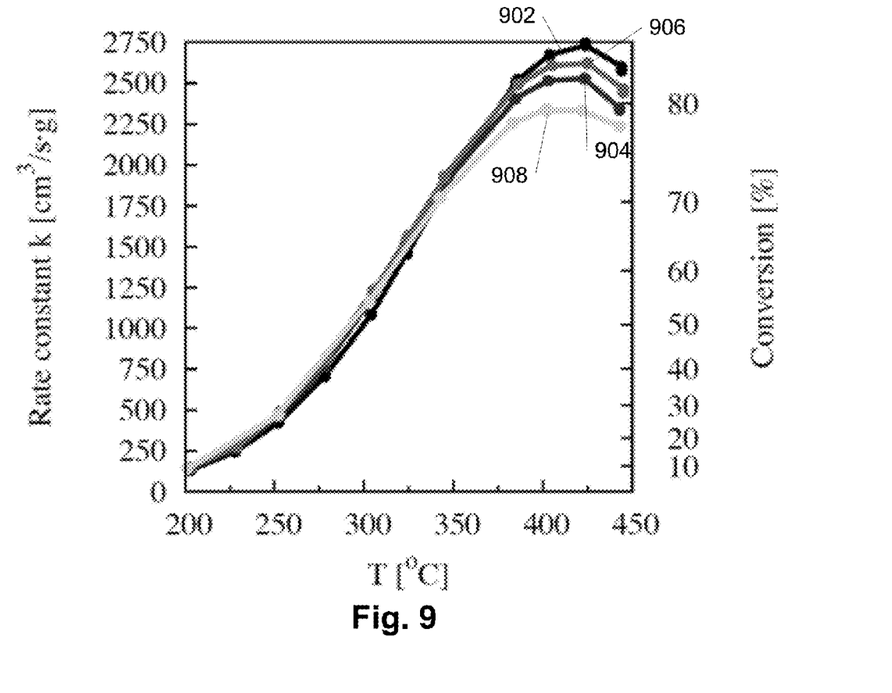
FIG. 9 shows the activity of the catalyst depending on the temperature used in the calcinations step 214.

Effect of Variation in the Ageing Time in Step 209 In FIG. 9 activity measurements after ageing at 25° C. in step 209 for different durations of time of 4 hours (line 902), 20 hours (line 904), 44 hours (line 906) and 72 hours (line 908) are presented. The activity measurements show a decrease in activity with longer ageing. The optimum gelation time in step 209 is therefore around 4 hours instead of the original 72 hours reported in WO2010055169. The shorter gelation time in step 209 is advantages as it increases the activity and decreases the waiting time during synthesis.

Following the ageing step 209, addition of a strong acid such as $H_2SO_4$ as described as step 210 in FIG. 1, may be employed.

Effect of Drying in Step 211 Compared to Vacuum Drying in Step 212

Drying of the catalyst in step 211 before calcination in step 214 is an extremely important step due to the possible deposition of organic chemicals on the catalyst surface. The organic residues will then deactivate the active centres occupying the surface, where ammonia otherwise would adsorb. Upon calcinations in step 214, the organic residue will be oxidised leaving a reduced and carbon covered catalyst surface. This has a big influence on the catalysts activity.

Figure 10A:
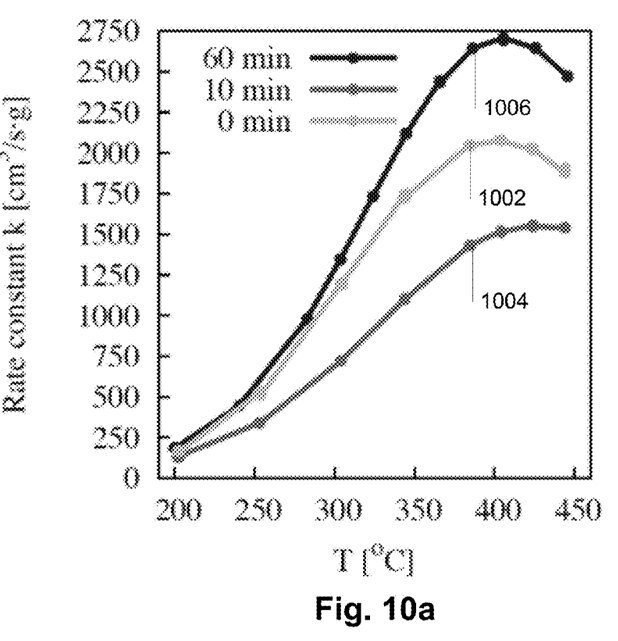
FIG. 10a-b show the activity of the catalyst using vacuum drying (FIG. 10a) as in step 212 the prior art method compare to the activity of the catalyst using drying at atmospheric pressure according to step 211 of the present invention (FIG. 10b).
Figure 10B:
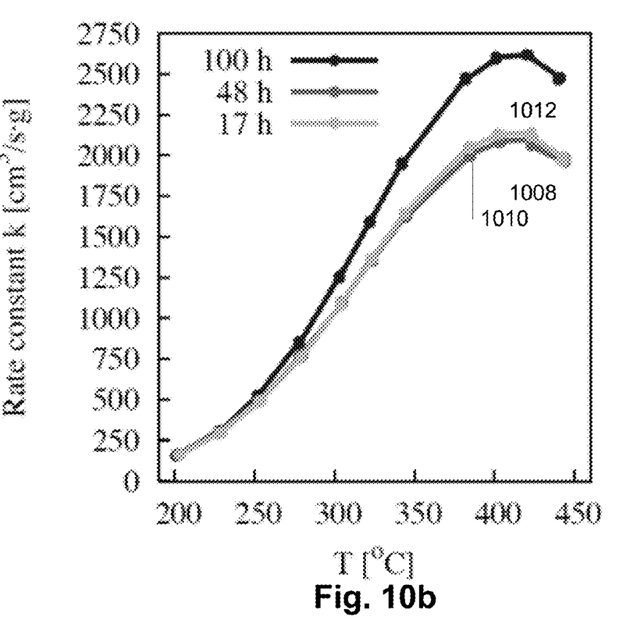

Vacuum drying used in step 212 in WO2010055169 is a very tedious and inconvenient way of drying in an upscaled process for the production of the catalyst. Results show that similar result to the vacuum drying could be obtained by drying in a ventilated oven at 85° C. for at least 100 hours when comparing the results of the activity measured for the same type of catalyst prepared by using vacuum drying as shown in FIG. 10a for a vacuum drying time of 0 min (1002), 10 min (1004) and 60 min (1006) and FIG. 10b for drying in a ventilated oven at 85° C. for 17 hours (1008), 48 hours (1010) and 100 hours (1012).

Thus, using the ventilated oven drying method of step 211 will make the production of large amounts of catalyst much easier. If the process is industrialised the drying step 211 could be optimised further with more effective drying methods e.g. spray drying or drying in a rotary oven.

Effect of Calcination Temperature and Calcinations Time in Step 214

Results further shows that the optimal calcination in step 214 was slow heating up to a desired temperature, in this case above 400° C., followed by calcination at this temperature. Further, at too low calcinations temperature, the catalyst will not crystalline and at too high calcinations temperature, the crystal growth and agglomeration becomes too severe, e.g. at 380° C., the catalyst is still amorphous and not active, thus this calcination temperature is too low if the catalyst is upscaled. At 400° C., the catalyst is more crystalline and comprises very small crystals, but increasing the calcination temperature further increases the crystallite size. Temperature stability measurements showed that the increase in crystallite size did not deactivate the catalyst, but long calcination times at high temperatures—typically above 440° C.—are expected to deactivate the catalyst. Thus, a minimum calcination temperature ensuring a crystalline and active catalyst is 400° C. and a slow heating rate is preferred.

In an embodiment of the invention, the calcination is carried out for between 4 and 6 hours at between 390° C. and 420° C. In another embodiment the calcination is carried out for 4 hours at 400° C. In another embodiment the calcination is carried out for 2-12 hours at 400° C.

Two-Site Model

Figure 11:
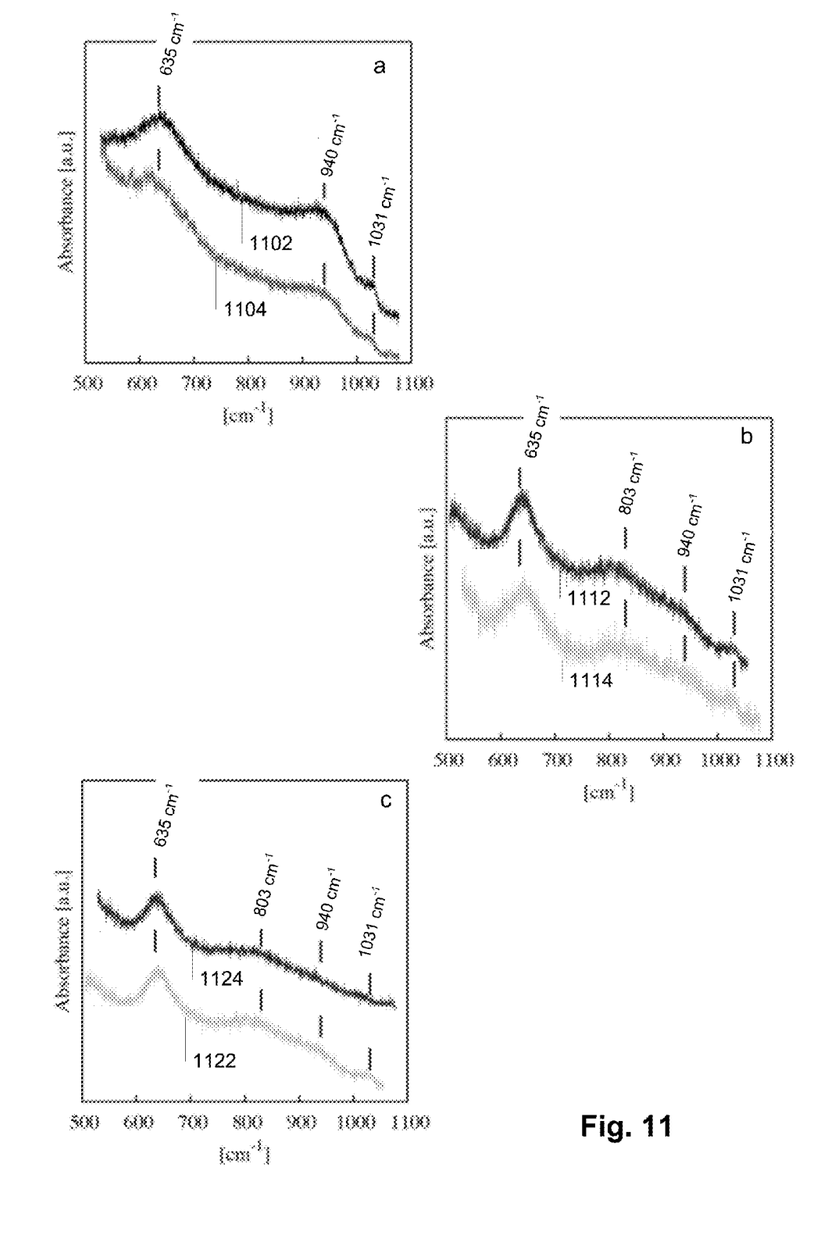
FIGS. 11a-c show the in-situ Raman spectra of three different catalysts.

FIGS. 11a-c show the in-situ Raman spectra of three different catalysts recorded with a homemade Raman cell equipped with a gas inlet and a gas outlet and a thermocouple sheath possessing a sample holder at its tip. Approximately 100 mg of each catalyst was pressed into a wafer and mounted on the holder that could be vertically adjusted in the in situ cell. The gases used were $O_2$ (L'Air Liquide 99.995%) at a 15 cm$^3$/min flow, 10000 ppm $NH_3/N_2$(L'Air Liquide) and $N_2$ (L'Air Liquide 99.999%) of which the flows were controlled by electronic mass flow meters.

A 491.5 nm diode pumped solid state laser (Cobolt/Sweden) was used for recording of the Raman spectra. The laser beam, operated at a power level of 80 mW, was focused on the sample by a cylindrical lens. The incident light was slightly defocused in order to reduce sample irradiance. The scattered light was collected at 90°, analysed with a 0.85 m Spex 1403 double monochromator and detected by a −20° C. cooled RCA PMT equipped with EG&G photon counting electronics interfaced with Labspec software.

Due to the extremely low scattered 97 signal arising from the samples, very slow scans (up to 7 hours per scan) were necessary in order to improve the signal-to-noise ratio. Recording of spectra took place initially at ambient conditions and subsequently at 250° C. under flowing $O_2$ (in situ dehydrated conditions) after exposing the studied sample for 30 min at 420° C. under flowing $O_2$. Each sample was then subjected to a 2200 ppm $NH_3/N_2$ flow for 30 min and the corresponding in situ Raman spectrum was recorded.

FIG. 11a shows the in-situ Raman spectra of a 20 wt % $V_2O_5/TiO_2$ catalyst synthesised with ethanol and $H_2SO_4$ in step 206 and $NH_4Cl$ as seed (the $H_2SO_4/EtOH$ catalyst). FIG. 11b shows the in-situ Raman spectra of a 20 wt. % $V_2O_5/TiO_2$ catalyst synthesised with THF and $HNO_3$ in step 206 and $NH_4Cl$ as seed (the $HNO_3/THF$ catalyst). FIG. 11c shows the in-situ Raman spectra of a 20 wt % $V_2O_5/TiO_2$ catalyst synthesised with methanol and $H_2SO_4$ in step 206 and $NH_4Cl$ as seed (the $H_2SO_4/MeOH$ catalyst).

Lines 1102, 1112 and 1122 show the Raman spectrum measured under flowing $O_2$ and lines 1104, 1114 and 1124 show the Raman spectrum measured under flowing $NH_3/N_2$ at 250° C.

The strong feature seen at 635 cm$^{-1}$ in all of the spectra 1102, 1104, 1112, 1114, 1122, 1124 originate from the vibration mode of $TiO_2$. The rest of the bands arise from dispersed amorphous vanadates or deposited vanadia overlayers.

The $H_2SO_4/EtOH$ catalyst displayed in FIG. 11a exhibits the typical characteristics of a $V_2O_5/TiO_2$ catalyst with a high coverage of dispersed vanadia. The V=O stretch is observed at 1031 cm$^{-1}$ and the 940 cm$^{-1}$ broad feature is assigned to anti-symmetric V—O—V stretches, which judged from their location originate from small vanadate sites.

The $HNO_3/THF$ catalyst displayed in FIG. 11b exhibit the V=O stretching band as well as the broad V—O—V feature like observed in the $H_2SO_4/EtOH$ catalyst. However, a new broad band is observed at 830 cm$^{-1}$, which is a strong indication of an occurrence of amorphous polyvanadate overlayers—site B species illustrated in FIG. 7. This suggests a poorer dispersion of the vanadia.

The very low surface area $H_2SO_4/MeOH$ catalyst displayed in FIG. 11c shows the same bands as the $HNO_3/THF$ catalyst displayed in FIG. 11b supporting the two-site hypothesis, since both of these species have a lower surface area than the $H_2SO_4/EtOH$ catalyst, but a higher activity.

An alternative interpretation of the spectral features in FIGS. 11a-c is that the feature at 830 cm$^{-1}$ arises from the V—O—V stretching and the band at 940 cm$^{-1}$ is stretching of Ti—O—V interface bonds. This interpretation also fits with the observations stated above showing an increase of V—O—V signal and a decrease of V—O—Ti signal with decreasing surface area.

From this it is concluded that the active centres are not identical on the catalysts, suggesting that the solvent is not only effecting for the surface area but also the nature of the active centres. This also illustrates the difference in activity of polymeric and dimeric vanadia species. Thus, the $H_2SO_4/MeOH$ catalyst has a low surface area (FIG. 5 bottom part) but retains a high activity (FIG. 5 top part) due to polymeric vanadia species.

Overall it can be concluded that a major increase in activity is observed when using HCl, $HNO_3$ or $H_2SO_4$ instead of HOAc in step 206. The activity is further improved by choosing the solvent in step 204 and the seed in step 202 clever.

Another aspect of the invention concerns nanoparticular vanadium oxide/anatase titania catalysts obtainable by a process as described in the improved method above.

In a specific embodiment the nanoparticular vanadium oxide/anatase titania catalyst is characterized by having a catalyst metal oxide content of up to 25 wt % $V_2O_5$, preferably up to 20 wt % $V_2O_5$.

Disclosed herein is also a nano-sized particular (nanoparticular) vanadium oxide/anatase titania catalysts with a monolayer vanadium oxide ($V_2O_5$) loading with a catalyst metal oxide content of up to 25 wt % $V_2O_5$ of the total nanoparticular vanadium oxide/anatase titania catalysts mass, wherein the nanoparticular vanadium oxide/anatase titania catalysts has an average $V_2O_5$ particle size between 4-16 nm and an active surface area/BET surface area between 60-300 m$^2$/g.

In one or more embodiments, the catalyst metal oxide content is between 5-25 wt % $V_2O_5$, or 5-20 wt % $V_2O_5$, or 10-20 wt % $V_2O_5$, or 15-20 wt % $V_2O_5$, or 10-15 wt % $V_2O_5$.

In another embodiment the nanoparticular vanadium oxide/anatase titania catalyst is characterized by having a mean particle size between 6 and 16 nm.

In one or more embodiments, the average $V_2O_5$ particle size is between 4-8 nm, or between 5-6 nm.

In yet another embodiment the nanoparticular vanadium oxide/anatase titania catalyst is characterized by having an active surface area/BET surface area of between 64 and 300 m$^2$/g. In yet another embodiment the nanoparticular vanadium oxide/anatase titania catalyst is characterized by having an active surface area/BET surface area of between 130 and 280 m$^2$/g. In yet another embodiment the nanoparticular metal oxide catalyst is characterized by having an active surface area/BET surface area of between 130 and 250 m$^2$/g.

In one or more embodiments, the nanoparticular vanadium oxide/anatase titania catalyst exhibiting Raman spectra according to any of FIGS. 11a-c.

Each of the embodiments mentioned herein and the use thereof may be claimed individually. In addition, it should be understood that various aspects, embodiments, implementations or features of the invention can be used separately or in any combination.

REFERENCES 102 solution of solution of an ammonia salt in a first solvent
104 solution of one or more hydrolysable titania precursors and one or more hydrolysable vanadium precursors in a second solvent 106, 106' sol-gel reaction mixture
108, 108' nanoparticular metal oxide catalyst precursors
110 sulfated gel
112, 112' dry nanoparticular metal oxide catalysts gel
114, 114' nanoparticular metal oxide catalysts
200 prior art method of preparation of the catalysts
200' improved method of preparation of the catalysts
202 preparing the first solution 102
204 preparing the second solution 104
206 mixing the two solutions from step 202 and 204
208 aging for between 4 and 72 hours
209 aging for between 2 and 8 hours
210 adding an effective amount of a strong acid
211 drying at 85° C. and atmospheric pressure for 72 hours
212 vacuum drying
214 calcining for between 2 and 8 hours at between 250-500 ° C.
300 activity measurements of the nanoparticular metal oxide catalysts
302 activity measurements @ ethanol and $H_2SO_4$
304 activity measurements @ ethanol and HCl
306 activity measurements @ ethanol and $HNO_3$
308 activity measurements @ ethanol and HOAc
310 activity measurements @ ethanol
400 BET surface area
402 BET surface area @ $H_2SO_4$
404 BET surface area @ HCl
406 BET surface area @ $HNO_3$
408 BET surface area @ HOAc
410 BET surface area @ no acid
500 activity measurements of the nanoparticular metal oxide catalysts
502 activity measurements @ $H_2SO_4$
504 activity measurements @ HCl
506 activity measurements @ $HNO_3$
508 activity measurements @ HOAc
802 activity measurements @ $NH_4NO_3$ seeds, HOAc and EtOH
804 activity measurements @ $(NH_4)_2CO_3$ seeds, HOAc and EtOH
806 activity measurements @ $NH_4Cl$ seeds, HOAc and EtOH
808 activity measurements @ $(NH_4)_2SO_4$ seeds, HOAc and EtOH
902 activity measurements after ageing at 25° C. for 4 hours
904 activity measurements after ageing at 25° C. for 20 hours
906 activity measurements after ageing at 25° C. for 44 hours
908 activity measurements after ageing at 25° C. for 72 hours
1002 activity measurements @ vacuum drying time of 0 min
1004 activity measurements @ vacuum drying time of 10 min
1006 activity measurements @ vacuum drying time of 60 min
1008 activity measurements @ ventilated oven at 85° C. for 17 hours
1010 activity measurements @ ventilated oven at 85° C. for 48 hours
1012 activity measurements @ ventilated oven at 85 ° C. for 100 hours
1102 Raman spectrum of $H_2SO_4$/EtOH @ $O_2$ flowing
1104 Raman spectrum of $H_2SO_4$/EtOH @ $NH_3/N_2$ flowing at 250° C.
1112 Raman spectrum of $HNO_3$/THF @ $O_2$ flowing
1114 Raman spectrum of $HNO_3$/THF @ $NH_3/N_2$ flowing at 250° C.
1122 Raman spectrum of $H_2SO_4$/MeOH @ $O_2$ flowing
1124 Raman spectrum of $H_2SO_4$/MeOH @ $NH_3/N_2$ flowing at 250° C.

The invention claimed is:

1. A method of preparation of nano-sized particular vanadium oxide/anatase titania catalysts, the nano-sized particular vanadium oxide/anatase titania catalysts comprising an anatase titania carrier and a catalytically active vanadium oxide component, the method comprising the following steps:
   a) providing a solution of an ammonium salt in a first solvent;
   b) providing a solution of one or more hydrolysable titania precursors and one or more hydrolysable vanadium precursors in a second solvent;
   c) combining the solutions of step a) and b) under acidic, aqueous conditions using hydrochloric acid, sulphuric acid or nitric acid, thereby hydrolyzing the one or more hydrolysable titania precursors and the one or more hydrolysable vanadium precursors;
   d) aging the reaction mixture of step c) thereby allowing the hydrolytic processes to proceed substantially to completion, thereby providing nano-sized particular titania catalyst precursors comprising crystallization seeds upon which the vanadium oxide is co-precipitated with the titania carrier material;
   e) removing solvents and volatile reaction components by either
      i) drying at atmospheric pressure and temperatures between 50° C. and 120° C. for between 50 hours and 200 hours, or
      ii) spray drying at temperatures between 50° C. and 120° C., and
   f) calcining the nano-sized particular titania catalysts precursor at temperature above 380° C.

2. A method according to claim 1 wherein the aging in step d) proceeds for between 0.5 and 8 hours.

3. A method according to claim 1 wherein the temperature used in step e) i) is between 70° C. and 95° C.

4. A method according to claim 1, wherein the step e)i) proceeds for between 100 hours and 200 hours.

5. A method according to claim 1 wherein the temperature used in step e) ii) is between 60° C. and 90° C.

6. A method according to claim 1, wherein the calcining in step f) proceeds for between 2 and 10 hours.

7. A method according to claim 1, wherein the first solvent comprises water, and the second solvent is selected from polar, water miscible solvents; cyclic ethers; dialkylketones; alkylnitriles, and mixtures thereof, optionally comprising water.

8. A method according to claim 7 wherein the second solvent is selected from the group of $C_1$-$C_4$ alcohols, tetrahydrofuran, and mixtures thereof, optionally comprising water.

9. A method according to claim 1, wherein the ammonium salt is:

wherein each R group is individually selected from the group consisting of hydrogen, $C_1$-$C_{12}$ alkyl, phenyl-$C_1$-$C_6$ alkyl, alcohol-, ether-, ester-, amine-, amide-, cyano-, and halogen-functionalized alkyl chains, such that all four R groups are identical or three R groups are identical or two R groups are identical or all four R groups are different; and wherein $X^-$ is a negatively charged ion, a halide or an oxyanion.

10. A method according to claim 9 wherein the ammonium salt is a salt selected from the group consisting of ammonium chloride, ammonium bromide, ammonium nitrate, ammonium carbonate, ammonium hydrogen sulphate, ammonium hydrogen carbonate, ammonium carbamate and ammonium sulfate.

11. A method according to claim 1, wherein the titania carrier further comprises a metal selected from the group consisting of zirconium, cerium, tungsten, silicon, aluminum, and a mixture thereof.

12. A method according to claim 1, wherein the catalytically active vanadium oxide component further comprises an oxide of a metal selected from the group consisting of iron, copper, platinum, palladium, chromium, manganese, molybdenum and a mixture thereof.

13. A method according to claim 1, wherein the one or more hydrolysable titania precursors is anatase titanium dioxide and the one or more hydrolysable vanadium catalyst precursors is vanadium oxide.

14. A method according to claim 13 wherein the vanadium oxide content in the nano-sized particular vanadium oxide/anatase titania catalysts is up to 25 wt %.

15. A method according to claim 1, wherein prior to drying the mixture in step e), an effective amount of a strong acid, is added, wherein the strong acid is selected from the group consisting of hydrochloric acid, nitric acid, sulphuric acid, methanesulphonic acid and trifluoromethanesulphonic acid.

16. A method according to claim 1, wherein the aging in step d) proceeds for 4 hours.

17. A method according to claim 1, wherein the temperature used in step e) i) is 85° C.

18. A method according to claim 1, wherein the step e)i) proceeds for between 80 hours and 90 hours.

19. A method according to claim 1, wherein the temperature used in step e) ii) is between 50° C. and 80° C.

20. A method according to claim 1, wherein the calcining in step f) proceeds for between 4 and 5 hours.

21. A method according to claim 7, wherein the water miscible solvent is a $C_1$-$C_4$ alcohol.

22. A method according to claim 7, wherein the cyclic ether is tetra-hydrofuran.

23. A method according to claim 7, wherein the dialkylketone is acetone.

24. A method according to claim 7, wherein the alkylnitrile is acetonitrile.

25. A method according to claim 9, wherein the negatively charged ion is a $C_1$-$C_4$ carboxylate.

26. A method according to claim 9, wherein the halide is chloride.

27. A method according to claim 9, wherein the oxyanion is carbonate.

28. A method according to claim 14, wherein the vanadium oxide content in the nano-sized particular vanadium oxide/anatase titania catalysts is up to 20 wt %.

29. A method according to claim 15, wherein 0.05-1 mole protons per mole metal oxide is added.

* * * * *